Aug. 27, 1968   G. E. NYMAN ET AL   3,398,580

THERMOCOUPLE TEMPERATURE MEASUREMENT

Filed Oct. 22, 1965

INVENTORS
GEORGE E. NYMAN
LEWIS K. SCHULTZ

BY *Robert W. Sly*
ATTORNEY

United States Patent Office 3,398,580
Patented Aug. 27, 1968

3,398,580
THERMOCOUPLE TEMPERATURE
MEASUREMENT
George E. Nyman, Poughkeepsie, N.Y., and Lewis K. Schultz, Shelburne, Vt., assignors to International Business Machines Corporation, Armonk, N.Y., a corporation of New York
Filed Oct. 22, 1965, Ser. No. 501,761
2 Claims. (Cl. 73—359)

ABSTRACT OF THE DISCLOSURE

A thermocouple device for measuring the temperature of a flat conductive element, in which the measuring junction is formed by the element and two separated thermocouple leads. The separated leads are urged against the conductive element by a spring-biased lever arm. The thermocouple leads are connected to a constant temperature cold junction and an indicating device.

---

This invention relates to the measurement of temperature and more particularly concerns a method and means for measuring temperature which involves the thermocouple principle.

In the fabrication of flat film memory plates which are combined with striplines and pressure plates to form computer memory arrays, it is necessary to control very precisely the temperature of the memory plates when they are being plated with magnetic material. It was attempted to measure the plate temperature by a conventional thermocouple. The thermocouple was placed adjacent to, or in contact with, the back surface (the surface not being plated by an evaporative process). However, a very slight improper contact or an actual gap gave inaccurate and variable temperature readings which vary adversely affected the plating of magnetic material. Temperature is the primary control over the coercive force of the magnetic film which is deposited by the evaporative process. It was also proposed, in order to obtain this critical temperature monitoring, that the thermocouple be embedded in the flat film memory plates. However, this provide impractical since the drilling of a hole, in effect, destroyed the plate. Its high degree of flatness was altered so as not to be capable of proper assembly and also internal stresses were created which could not be tolerated in the plates.

An object of this invention is the provision of a method and means for measuring temperature which uses the thermocouple principle and yet avoids the above-noted disadvantage of poor contact which gives inaccurate temperatures.

Another object is the provision of such a method and means whereby embedding or permanently attaching a thermocouple with the aforenoted disadvantage is avoided and yet high accuracy in monitoring temperatures is achieved.

A further object is to provide a method of measuring temperature of a heated element when two dissimilar thermocouple wires contact the element at different points so that the element becomes part of the thermocouple system, whereby a no contact condition will not give a temperature reading, rather than an inaccurate reading.

An additional object is to provide apparatus whereby proper contact with a heated element can be easily made at two points by thermocouple elements and the temperature accurately indicated.

In accordance with the illustrative embodiment of the invention, an element to be uniformly heated and temperature controlled is provided and first and second thermocouple wire contacts are urged against the element. The other ends of the thermocouple wires are connected to provide a constant temperature, cold junction and the generated thermal EMF in the system (which includes the element) is used to indicate temperature. The disclosed apparatus includes a rotatable head having the contacts or probe ends projecting downwardly therefrom. The head is carried by a spring-biased pivot arm. The arm is pivoted to raise the head so that the metal plate or substrate can be placed under the head in a fixture. The pivot arm then is released so that the spring-biased probes contact the substrate. The probes are the ends of dissimilar thermocouple wires which are connected to give a cold junction arrangement with a device adapted to respond to thermal EMF.

The realization of the above objects along with the features and advantages of the invention will be better appreciated by reference to the following description and the accompanying drawings in which.

Figure 1:
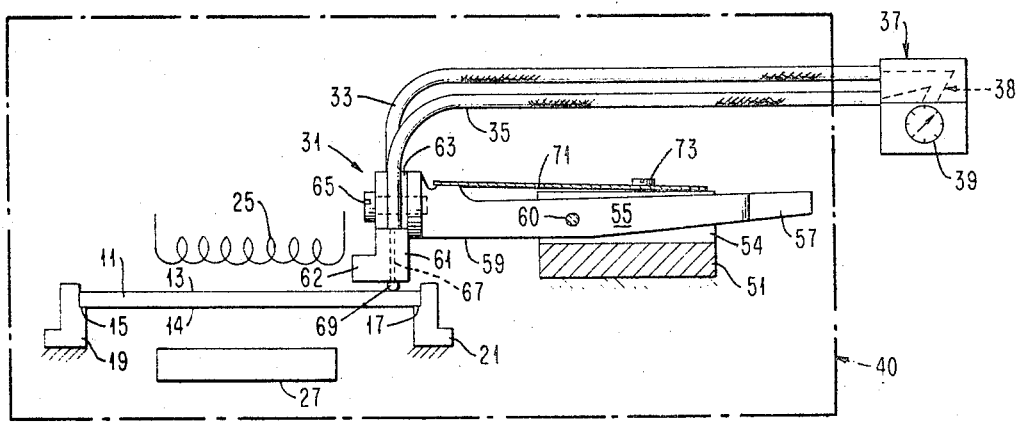
FIG. 1 is a generally-schematic view of a substrate mounted in a fixture within an evaporative process vacuum chamber and shows the side of a pivotable thermocouple device over the substrate with wires leading to a thermocouple temperature indicator.

Referring to FIG. 1, a metal substrate 11 having top and bottom surfaces 13 and 14 is mounted on two ledges 15 and 17 of left and right rails 19 and 21 of a fixture. Above the substrate 11, an electrical heating coil 25 is provided and serves as a controlled source of radiant heat for heating the substrate which is made of silver-copper alloy (80%–20%). The temperature is desirably regulated to within a few degrees of 270° F. Below the substrate, an evaporative source of plating material, such as a magnetic alloy of iron and nickel, is symbolically indicated by box 27. A thermocouple contact device 31 is shown above and to the right of the right edge of the substrate. The device 31 is shown double actual size. A first and second thermocouple wire 33 and 35 extend from device 31 to a conventional, remotely-located thermocouple indicator 37. This indicator has a constant-temperature, cold junction arrangement 38 (shown schematically by dashed lines) from the ends of wires 33 and 35 and has a temperature-indicating voltmeter 39 conventionally connected to, or forming part of the cold junction arrangement which is maintained at 72° F. The dashed-line box 40 schematically indicates a vacuum chamber as used in the evaporative deposition process. Being responsive to thermal EMF or voltage, the indicator 37 translates the voltage into temperature and can be used to control automatically the heating coil 25.

Figure 2:
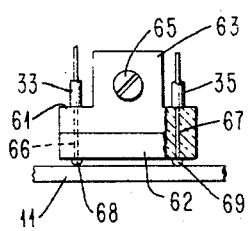
FIG. 2 is a top view of the thermocouple device and shows at the left the rotatable contact head and at right the pivot arm key for lifting the contact head against the flat leaf spring attached by two screws.
Figure 3:
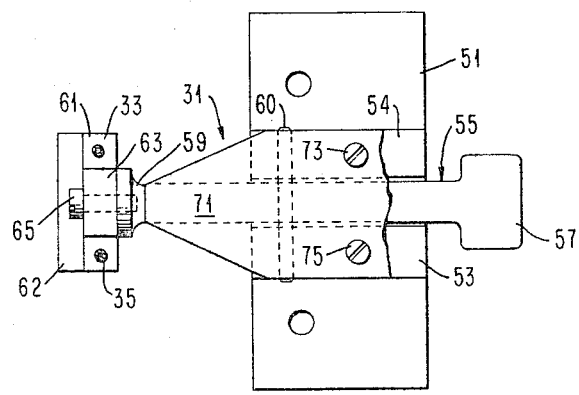
FIG. 3 is front view of the contact head and shows the contact probes engaging a segment of the metal substrate.

Referring now to FIGS. 1–3, the thermocouple contact device 31 includes three support parts, namely, a flat base plate 51 having two spaced-apart, upright brackets 53 and 54, a pivot arm 55 having an actuating key or end 57 and a contact projection or end 59, and a head or cross bar 61 and are, respectively, Chromel and Alumel extension 63 which is rotatably mounted by bolt 65 threaded into the contact end 59 of the pivot arm 55. Pin 60 extends through holes in arm 55 and the brackets 53, 54 to give the pivot arrangement. The bare thermocouple wires 33 and 35 extend through the ends of the cross bar 61 and are, respectively, Chromel and Alumel to give dissimilar thermocouple metallic materials. Other dissimilar thermocouple metallic materials can be used (such as iron, constantan, platinum, nickel and copper), depending on the temperatures and substrates which are involved. Other substrate material to be monitored can be high purity copper, molybdenum or rhodium. The ends 66 and 67 of the wires 33 and 35 have the insulation stripped therefrom and extend bare through two vertical holes in the electrically-insulating, boron nitride cross bar 61. The wire ends 66 and 67 terminate as contacts or probes 68 and 69 which are generally spherical in shape. The wire ends and holes are equispaced from the rotation axis (through the bolt 65) of the cross bar 61. The pivot arm 55 has its contact end 59 biased downwardly by the flat leaf spring 71 which is made from a non-magnetic high-heat-resistant, spring steel and is attached by two screws 73 and 75 threaded into the top parts of the plate brackets 53 and 54. The left converging end of the spring 71 abuts the contact end 59 of the pivot arm 55, when in use, so that the left end of the spring is flexed upwardly whereby it exerts a slight downward pressure on the contact end 59 and cross bar 61. This action translates into a downward urging of the probes 67 and 69 which is sufficient for thermocouple electron flow without deforming the substrate. Referring to FIG. 1, it can be appreciated that the wide leaf spring 71 required that the key or actuating end 57 of the pivot arm 55 be depressed in order to slide the substrate into the fixture which is fixed relative to the mounting plate 51. When not in use, the spring 71 would depress the probes 68 and 69 slightly below the plane of the top of the substrate. The spring 71, through the rotatable mounting of the cross bar 61, will give substantial equal pressure on each probe, although adequate but different pressures can be used. The cross bar 61 with its flange 62 shields the probes 67 and 69 from the heat which is radiated from coil 25.

Figure 4:
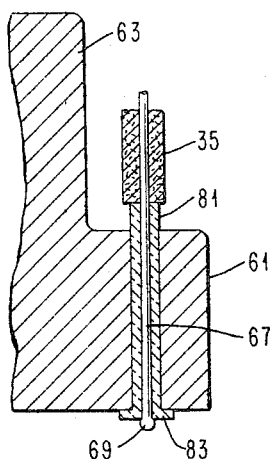
FIG. 4 is a partially-cross sectioned front view of a modified contact head and shows an insulating sleeve around a thermocouple wire.

In FIG. 4, one side of an aluminum cross bar 61 is shown and is provided with a boron-nitride, electrically, insulating sleeve 81 having bottom collar 83. The probe 69 abuts the collar and the bare wire 67 is within the sleeve 81 which extends slightly above the end of the cross bar to abut the asbestos insulation of the wire 35. Thus, another construction for insulating the wires from each other and from ground is provided.

In operation, the actuating end 57 of the pivot arm 55 is depressed so that the thermocouple probes 68 and 69 are elevated above the plane of the top of the substrate 11 to be inserted. After the substrate 11 is mounted in ledges 15 and 17 of the fixture rails 19 and 21, the actuating end 57 is released so that probes 68 and 69 of the Chromel and Alumel wires 33 and 35 contact with equal pressure the substrate 11 at locations which are spaced a small distance (0.5 inch) from each other. The contacts with the substrate 11 are made with slight pressure by spring 71 which is sufficient to provide a thermal-electrical contact so that a thermal EMF is generated when the dissimilar thermocouple wires are at a higher temperature at one pair of ends than the temperature at the other, lower temperature pair of ends. In the illustrative embodiment, a suitable vacuum is created in chamber 40 and the coil 25 provides radiant heat for the substrate 11. The cross bar 61 shields the probes 68 and 69. The evaporative source of material to be deposited is actuated when the thermocouple indicator 37 shows that the substrate 11 is at suitable temperature. The thermocouple wire probes 68 and 69 with the path provided by the metal substrate 11 constitute, in effect, the hot junction customarily found in the welded ends of dissimilar thermocouple wires. The cold junction arangement 38 at the other ends of the wires 33 and 35 is conventional and completes a thermocouple circuit. Thus, the temperature of the substrate or other electrical conductive metallic element is accurately indicated by translating the thermal EMF into a temperature reading by voltmeter 39. Such other elements can be made from steel, aluminum, brass and the like. It is to be noted that accurate temperature monitoring is achieved with ease in attachment and without adverse effect on the object which is to have its temperature measured.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for measuring the temperature of an element when it is heated, comprising:

a support structure having front and back sides, a pivot arm pivotally mounted in said support structure, said pivot arm having an actuating end which clears the back side of said structure and a contact end which extends beyond the front side of said structure, a cross bar having an upward center extension rotatably mounted on the contact end of said pivot arm, said cross bar having two vertical openings therethrough equally spaced from said upward extension, a first thermocouple contact wire extending through one of said cross bar openings and terminating in a probe contact, a second dissimilar thermocouple contact wire extending through the other of said cross bar openings and terminating in a probe contact, and said pivot arm being spring-biased and constructed so that depressing its actuating end permits placing an element below said cross bar without contact with the probe contacts and so that releasing the pivot arm permits the spring to urge the probe contacts against an element with uniform pressure, whereby said thermocouple wires can be connected to means for detecting a thermal EMF when said probe contacts engage an element which is heated.

2. Apparatus for measuring the temperature of an element when it is heated, comprising:

a support structure having a flat plate with front and back sides, mounting brackets extending upward from said plate and having opposed openings and a pivot pin received in said openings, a pivot arm mounted on said pin and arranged to pivot between said brackets, said pivot arm having an actuating end which clears the back side of said plate and a contact end which extends beyond the front side of said plate, said contact end of said pivot arm having a threaded horizontal hole, a cross bar having an upward extension rotatably mounted on the contact end of said pivot arm by means of a fastener extending through said upward extension into the threaded hole of the contact end of the pivot arm, said cross bar having two vertical openings therethrough equally spaced from the axis of said fastener, a first thermocouple contact wire extending through one of said cross bar openings and terminating in a probe contact, a second thermocouple contact wire extending through the other of said cross bar openings and terminating in a probe contact, said cross bar being made from boron nitride to provide electrical insulation for said contact wires, a fixture for receiving an element which is to have its temperature measured so that the element is below said probe contacts, a wide leaf spring mounted on said brackets and extending horizontally to contact and urge downwardly the contact end of said pivot arm, said pivot arm being constructed so that depressing its actuating end permits placing an element in said fixture without contact with the probe contacts and so that releasing the pivot arm permits the spring to urge the probe contact against the element with uniform pressure, and means connected to said thermocouple wires for providing a thermocouple circuit and detecting a thermal EMF when an element is in contact with said probe contacts and is heated.

References Cited

UNITED STATES PATENTS

| 2,177,837 | 10/1939 | Miller | 73—359 XR |
| 2,466,137 | 4/1949 | Vollrath | 136—221 |
| 2,694,313 | 11/1954 | Nieman | 73—359 XR |

S. CLEMENT SWISHER, *Acting Primary Examiner.*

F. SHOON, *Assistant Examiner.*